US011639777B2

(12) United States Patent
Yang (10) Patent No.: US 11,639,777 B2
(45) Date of Patent: May 2, 2023

(54) LAMP

(71) Applicant: Unipros Camping Products Company Limited, Xiamen (CN)

(72) Inventor: Yonggeng Yang, Xiamen (CN)

(73) Assignee: Unipros Camping Products Company Limited, Xiamen (CN)

( * ) Notice: Subject to any disclaimer, the term of this patent is extended or adjusted under 35 U.S.C. 154(b) by 0 days.

(21) Appl. No.: 17/379,295

(22) Filed: Jul. 19, 2021

(65) Prior Publication Data

US 2022/0026032 A1    Jan. 27, 2022

(30) Foreign Application Priority Data

Jul. 21, 2020 (CN) .......................... 202010705038.4

(51) Int. Cl.
*F21S 6/00* (2006.01)
*F16M 11/24* (2006.01)
*F21L 4/04* (2006.01)

(52) U.S. Cl.
CPC .............. *F21S 6/005* (2013.01); *F16M 11/24* (2013.01); *F21L 4/04* (2013.01); *F16M 2200/028* (2013.01); *F16M 2200/08* (2013.01)

(58) Field of Classification Search
CPC .. F21S 6/005; F21S 6/002; F21S 6/008; F21L 4/08; F21L 4/04; F21V 21/104; F21V 21/108; F21V 21/112; F21V 21/116; F21V 21/22; F21V 21/28; F21V 23/0414; F21V 17/08; F21V 21/145; F16M 11/24; F16M 2200/028; F16M 2200/08
See application file for complete search history.

(56) References Cited

U.S. PATENT DOCUMENTS

| | | | | |
|---|---|---|---|---|
| 2,629,044 | A * | 2/1953 | Marfisi | G09F 13/00 362/281 |
| 3,325,639 | A * | 6/1967 | King | F21V 21/22 362/411 |
| 5,091,833 | A * | 2/1992 | Paniaguas | F21V 33/0028 362/808 |
| 2002/0167806 | A1 * | 11/2002 | Thaxton | F21V 21/28 362/396 |
| 2007/0252067 | A1 * | 11/2007 | Lee | F21V 21/22 248/407 |
| 2017/0336056 | A1 * | 11/2017 | Fan | F21V 21/145 |

* cited by examiner

*Primary Examiner* — Y M. Quach Lee
(74) *Attorney, Agent, or Firm* — Cooper Legal Group, LLC (57) ABSTRACT

A lamp comprises a lamp body and a connecting rod assembly. The connecting rod assembly is alternatively connected to a first connecting member or a second connecting member respectively to define a first use state and a second use state. When in the first use state, one or more connecting rods of at least three connecting rods which are connected successively in an axial direction define a lifting rod, and a first end of the lifting rod is connected to the first connecting member. When in the second use state, first ends of the at least three connecting rods are connected to the second connecting member, and second ends of the at least three connecting rods are spaced apart from each other to define a placing plane within which a vertical projection of a center of gravity of the lamp body is located.

18 Claims, 7 Drawing Sheets

LAMP

RELATED APPLICATIONS

This application claims priority to Chinese patent application number 202010705038.4, filed on Jul. 21, 2020. Chinese patent application number 202010705038.4 is incorporated herein by reference.

FIELD OF THE DISCLOSURE

The present disclosure relates to the field of household appliances, and in particular to a lighting device.

BACKGROUND OF THE DISCLOSURE

The existing portable lamps and table lamps are different types of lamps. A family needs to purchase each of a portable lamp and a table lamp when needs arise for a portable lamp and a table lamp. Not only is the cost high, but storing both a portable lamp and a table lamp takes up a lot of space. When the table lamp or the portable lamp is urgently needed, it is difficult to find the table lamp or the portable lamp due to being placed in different positions.

BRIEF SUMMARY OF THE DISCLOSURE

The present disclosure provides a lamp with functions of a portable lamp and a table lamp.

In order to solve the technical problem, a technical solution of the present disclosure is as follows.

A lamp comprises a lamp body and a connecting rod assembly. The lamp body is disposed with a first connecting member and a second connecting member. The connecting rod assembly is connected to the first connecting member to define a first use state, and the connecting rod assembly is connected to the second connecting member to define a second use state. The connecting rod assembly comprises at least three connecting rods. When the lamp is in the first use state, one of the at least three connecting rods or at least two connecting rods of the at least three connecting rods which are connected successively in an axial direction defines a lifting rod, and a first end of the lifting rod is connected to the first connecting member. When the lamp is in the second use state, first ends of the at least three connecting rods are connected to the second connecting member, and second ends of the at least three connecting rods are spaced apart from each other to define a placing plane within which a vertical projection of a center of gravity of the lamp body is located.

In a preferred embodiment, each of the first ends of the at least three connecting rods comprises a fixed member, and each of the second ends of the at least three connecting rods comprises a first fixed fitting member. When the lamp is in the first use state, the at least two connecting rods of the at least three connecting rods are connected successively in the axial direction, and the fixed member of one of the at least two connecting rods of the at least three connecting rods is correspondingly connected to the first fixed fitting member of the at least two connecting rods of the at least three connecting rods.

In a preferred embodiment, the second connecting member comprises at least three second fixed fitting members. When the lamp is in the second use state, the fixed members of the at least three connecting rods are correspondingly connected to the at least three second fixed fitting members.

In a preferred embodiment, the fixed member comprises a fixed push button, and at least one of the first fixed fitting member or each of the at least three second fixed fitting members comprises a locking groove configured to receive the fixed push button. When the fixed member is connected to the first fixed fitting member or each of the at least three second fixed fitting members, the fixed push button correspondingly moves into the locking groove.

In a preferred embodiment, the fixed member comprises an elastic member and a sliding groove. The sliding groove is disposed on each of the at least three connecting rods and extends along a radial direction of each of the at least three connecting rods. The elastic member is disposed between the sliding groove and the fixed push button. The first fixed fitting member and each of the at least three second fixed fitting members respectively comprises a connecting groove. A surrounding wall of the connecting groove comprises the locking groove. When the first end of each of the at least three connecting rods moves into the connecting groove, the fixed push button, which is pushed by the surrounding wall of the connecting groove and retracted, moves into the locking groove when corresponding to the locking groove.

In a preferred embodiment, the at least three connecting rods are successively sleeved and connected to make the lifting rod extendable. The connecting groove of the first fixed fitting member extends along the axial direction, the locking groove is adjacent to an opening of the connecting groove, and one of the at least three connecting rods slides in the connecting groove of another one of the at least three connecting rods.

In a preferred embodiment, the first end of the lifting rod is disposed with a first carabiner. The first connecting member comprises a connecting ring, a wire loop, and a second carabiner. The connecting ring is fixedly connected to the lamp body, the second carabiner is configured to be respectively buckled to the connecting ring and the wire loop, and the first carabiner is configured to be buckled to the wire loop.

In a preferred embodiment, the second connecting member is configured to be detachably connected to the lamp body.

In a preferred embodiment, the lamp body comprises a lamp housing and a light-emitting assembly disposed in the lamp housing. The lamp housing comprises a shade housing facing upward and a light transmissive housing facing downward. The shade housing comprises a connecting hole, the lamp body comprises a light transmissive decoration, which is connected to the connecting hole, and the light-emitting assembly is configured to emit a light ray for illuminating the light transmissive decoration through the connecting hole.

In a preferred embodiment, the lamp body comprises a lamp housing and a light-emitting assembly disposed in the lamp housing, and the lamp housing comprises a first light transmissive housing and a second light transmissive housing disposed on the first light transmissive housing.

Compared with the existing techniques, the technical solution has the following advantages.

1. The two different use states can be rapidly switched through the connecting rod assembly. When the lamp is in the first use state, one of the at least three connecting rods or at least two connecting rods of the at least three connecting rods which are successively connected along the axial direction define a lifting rod, the first end of the lifting rod is connected to the first connecting member, and a user can grasp the second end of the lifting rod to realize the function of the portable lamp. When the lamp is in the second use state, the first ends of the at least connecting rods are connected to the second connecting member, the second ends of the at least three connecting rods are spaced apart from each other to define a placing plane, and the placing plane can be placed on a desktop and achieves the function of the desk lamp.

2. Each of the first ends of the at least three connecting rods comprises a fixed member, and each of the second ends of the at least three connecting rods comprises a first fixed fitting member. When the lamp is in the first use state, the at least two connecting rods of the at least three connecting rods are connected successively in the axial direction, and the fixed member of one of the at least two connecting rods of the at least three connecting rods is correspondingly connected to the first fixed fitting member of the at least two connecting rods of the at least three connecting rods. The at least three connecting rods are successively connected through the same fixed member and the first fixed fitting member, so that the connection is simple and convenient, and an additional connection structure is not needed.

3. The second connecting member comprises a plurality of second fixed fitting members. When the lamp is in the second use state, the fixed members of the at least three connecting rods are correspondingly connected to the plurality of second fixed fitting members. The fixed members of the at least three connecting rods can also be directly connected to the plurality of second fixed fitting members, so that the connection is simple, convenient, and quick.

4. The at least three connecting rods are successively sleeved and connected to make the lifting rod extendable. The connecting groove of the first fixed fitting member extends along the axial direction, the locking groove is adjacent to an opening of the connecting groove, and one of the at least three connecting rods slides in the connecting groove of another one of the at least three connecting rods. When the connecting rod assembly needs to be stored, the at least three connecting rods can be sleeved and stretched in an extending manner, and the carrying is more convenient.

5. The lamp body comprises a lamp housing and a light-emitting assembly disposed in the lamp housing. The lamp housing comprises a shade housing facing upward and a light transmissive housing facing downward. The light transmissive housing comprises a connecting hole, and the lamp body comprises a light transmissive decoration which is connected to the connecting hole. The light-emitting assembly is configured to emit a light ray for illuminating the light transmissive decoration through the connecting hole. The setting of the shade housing, the light transmissive housing, and the light transmissive decoration can correspond to different structural appearances, increasing a child's interest.

DETAILED DESCRIPTION OF THE EMBODIMENTS

The present disclosure will be further described below in combination with the accompanying drawings and embodiments.

Some directional terms used to describe the drawings, such as "inner", "outer", "above", "below", and other directional terms will be understood to have their normal meaning and refer to those directions involved in normal viewing of the drawings. Unless otherwise indicated, directional terms described herein substantially follow conventional directions as understood by those skilled in the art.

The terms "first", "second", and similar terms used in the present disclosure do not denote any order, quantity, or importance in the present disclosure, but are used to distinguish one component from other components.

Referring to FIGS. 1-6, a lamp 100 comprises a lamp body 1. The lamp body comprises a lamp housing 11 and a light-emitting assembly disposed in the lamp housing 11. The lamp housing 11 comprises a shade housing 111 facing upward and a light transmissive housing 112 facing downward. The shade housing 111 comprises a connecting hole 1111, and the lamp body 1 comprises a light transmissive decoration 13, which is connected to the connecting hole 1111. The light-emitting assembly is configured to emit a light ray (e.g., having a wavelength in the visible light spectrum of about 380 nm to 750 nm) for illuminating the light transmissive decoration 13 through the connecting hole 1111. An outer contour of the lamp body 1 appears bee-shaped for aesthetic purposes, and the light transmissive decoration 13 appears to have the shape of a bee's wings. In some embodiments, referring to FIG. 7, the lamp housing 11 comprises a first light transmissive housing 14 and a second light transmissive housing 15 disposed on the first light transmissive housing 14, and the lamp body 1 appears duck-shaped. More specifically, the first light transmissive housing 14 and the second light transmissive housing 15 are yellow, and the lamp body 1 appears to be yellow duck-shaped.

The light-emitting assembly comprises two groups of colored lights and two white lights. Light rays emitted by the two white lights respectively extend along a horizontal forward direction (e.g., indicated by an arrow C) and a vertical downward direction (e.g., indicated by an arrow B). Each of the two groups of colored lights comprises a red lamp, a yellow lamp, and a blue lamp, and the lamp 100 comprises a switch 7 configured to alternatively switch the two groups of colored lights and the two white lights. The lamp 100 comprises a rechargeable battery configured to be charged through a micro universal serial bus (micro-USB) port.

Figure 1:
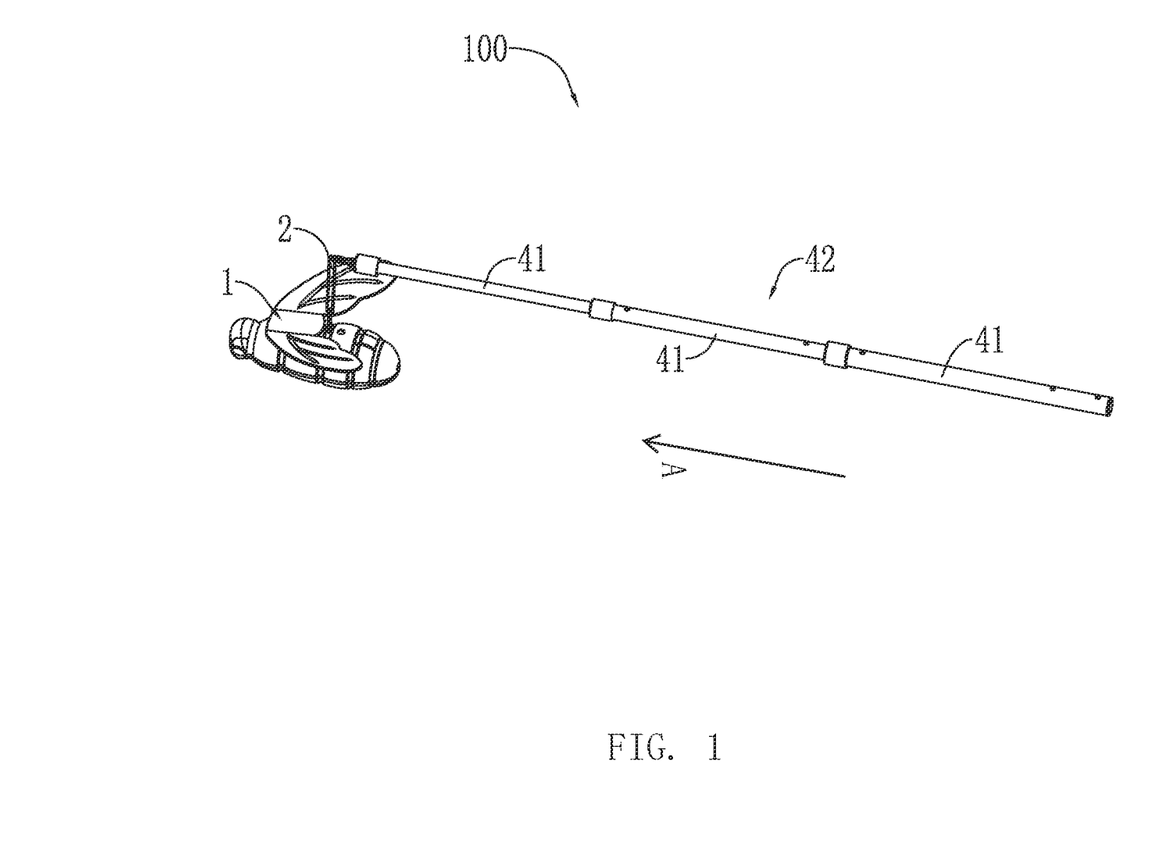
FIG. 1 illustrates a perspective view of a lamp in a preferred embodiment of the present disclosure when the lamp is in a first use state.
Figure 5:
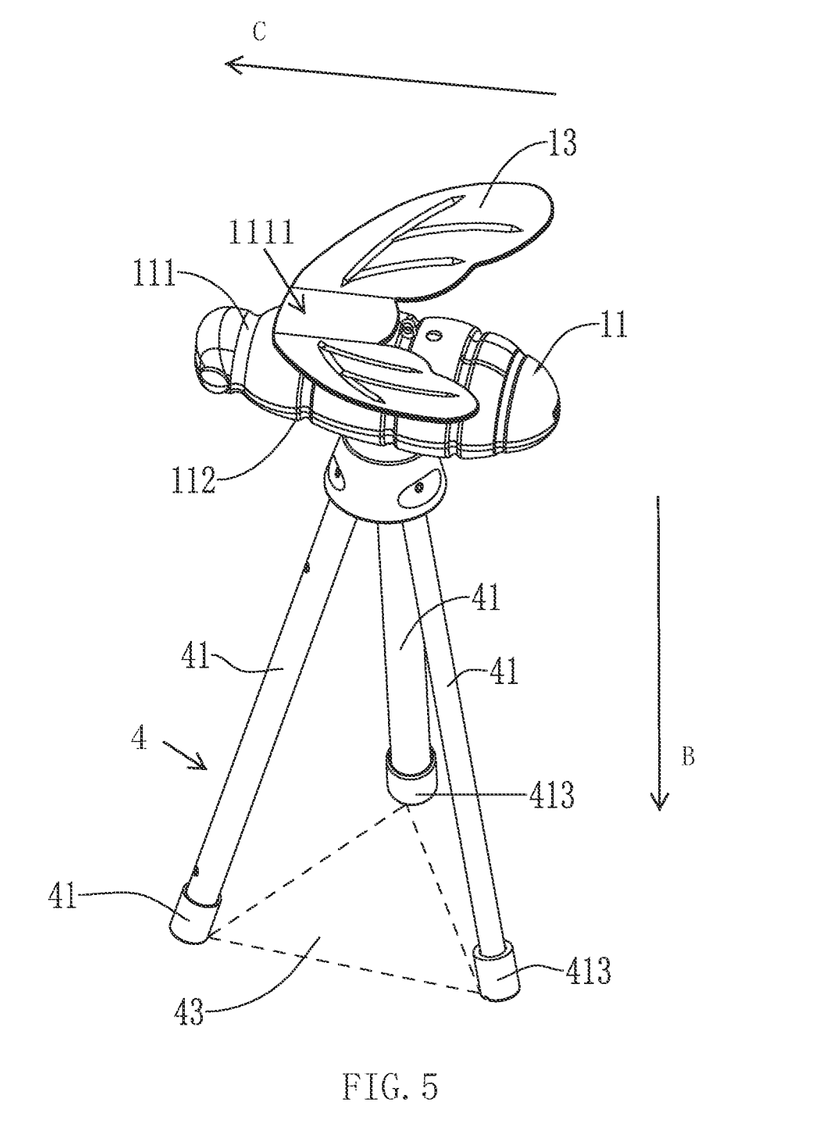
FIG. 5 illustrates a perspective view of the lamp in the preferred embodiment of the present disclosure when the lamp is in a second use state.

The lamp body 1 is disposed with a first connecting member 2 and a second connecting member 3. The lamp 100 further comprises a connecting rod assembly 4. The connecting rod assembly 4 is connected to the first connecting member 2 to define a first use state, and the connecting rod assembly 4 is connected to the second connecting member 3 to define a second use state. The connecting rod assembly 4 comprises at least three connecting rods 41. When the lamp 100 is in the first use state, one of the at least three connecting rods 41 or at least two connecting rods 41 of the at least three connecting rods 41 which are connected successively in an axial direction (e.g., axial direction indicated by an arrow A) defines a lifting rod 42. The lifting rod 42 can be defined by only one connecting rod 41, or the lifting rod 42 can be defined by two or more connecting rods 41 which are connected successively in the axial direction. A first end of the lifting rod 42 is connected to the first connecting member 2. At this time, a user can operate the switch 7 to turn on a first of the two white lights, which emits the light ray in the vertical downward direction. When the lamp 100 is in the second use state, first ends of the at least three connecting rods 41 are connected to the second connecting member 3, and second ends of the at least three connecting rods 41 are spaced apart from each other to define a placing plane 43 within which a vertical projection of a center of gravity of the lamp body 1 is located. At this time, the user can operate the switch 7 to alternatively turn on the first of the two white lights, which emits the light ray in the vertical downward direction, or the two groups of colored lights.

Figure 7:
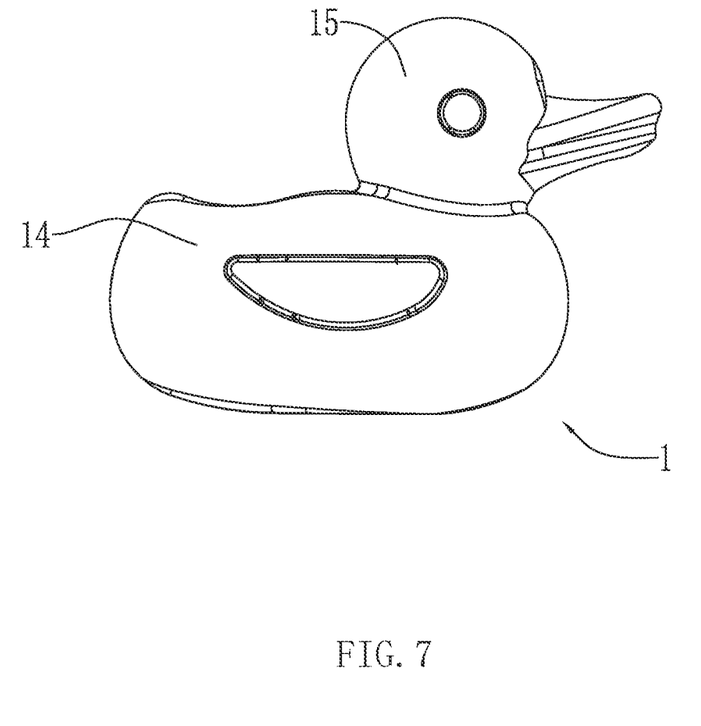
FIG. 7 illustrates a perspective view of a lamp body in the present disclosure, illustrating a first light transmissive housing and a second light transmissive housing.

The first connecting member 2 is disposed on the shade housing 111 or the first light transmissive housing 14, and the user can hold the lifting rod 42 to hang up the lamp body 1. The second connecting member 3 is disposed on the light transmissive housing 112 or the second light transmissive housing 15, and when the lamp 100 is in the second use state, the lamp 100 is supported on a desk or a floor so as to be used as a fixed light source. When the lamp body 1 is not disposed with the first connecting member 2 and the second connecting member 3, the user can operate the switch 7 to turn on a second of the two white lights, which emits the light ray in the horizontal forward direction. At this time, the lamp body 1 can be used as a flashlight.

Figure 2:
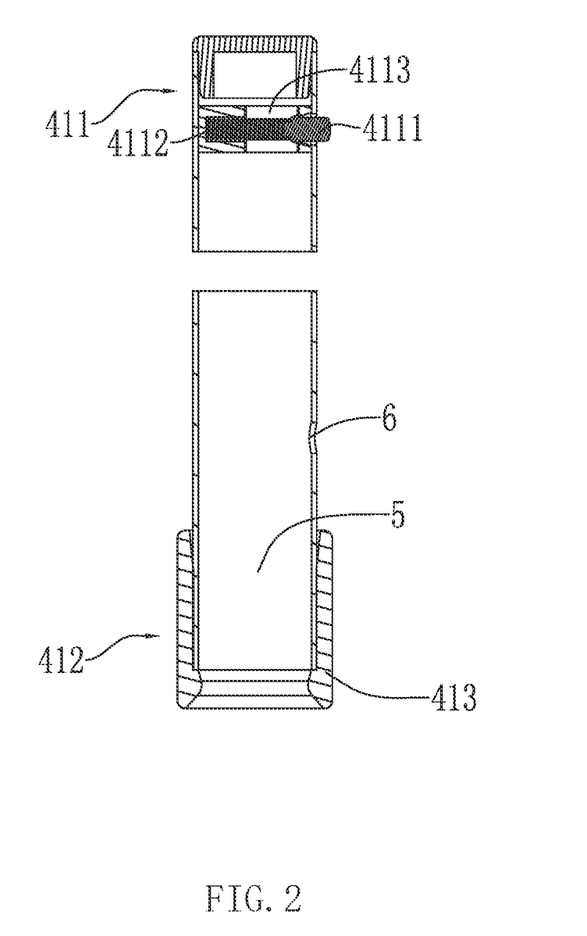
FIG. 2 illustrates a cross-sectional view of each of at least three connecting rods in a preferred embodiment of the present disclosure.
Figure 3:
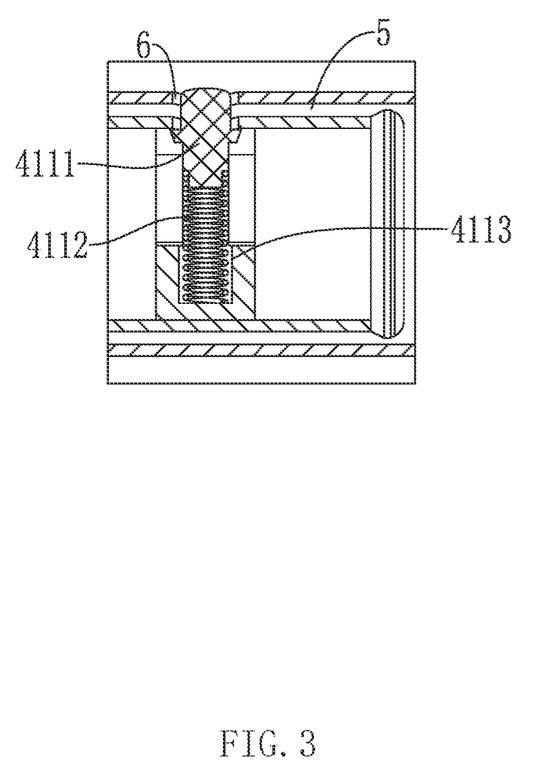
FIG. 3 illustrates a partial cross-sectional view of two of the at least three connecting rods, which are connected together, in the preferred embodiment of the present disclosure when the lamp is in a first use state.
Figure 6:
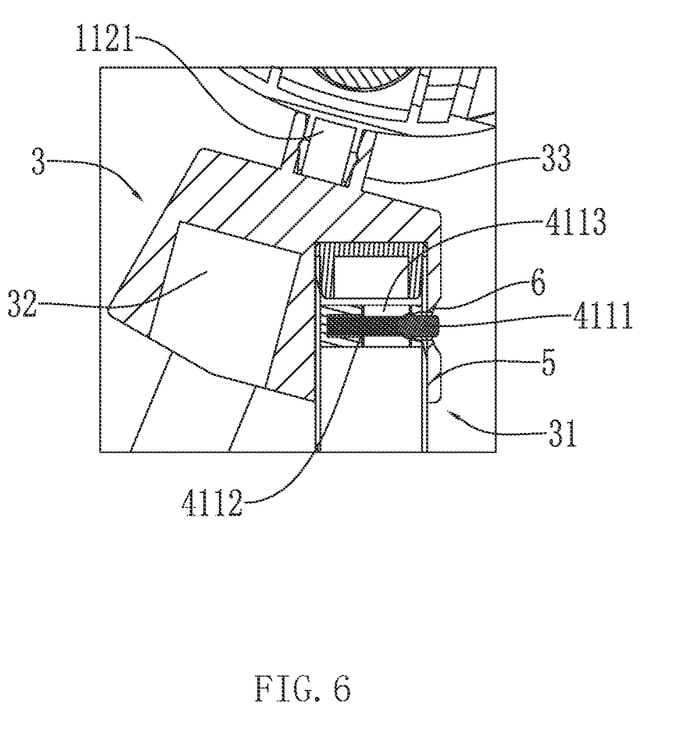
FIG. 6 illustrates a partial cross-sectional view of each of the at least three connecting rods connected to a second connecting member in the preferred embodiment of the present disclosure when the lamp is in the second use state.

In this embodiment, the at least three connecting rods 41 are three connecting rods 41. Each of the first ends of the three connecting rods 41 comprises a fixed member 411, and each of the second ends of the three connecting rods 41 comprises a first fixed fitting member 412. When the lamp 100 is in the first use state, the three connecting rods 41 are connected successively in the axial direction, and the fixed member 411 of one of the three connecting rods 41 is correspondingly connected to the first fixed fitting member 412 of another one of the three connecting rods 41. The second connecting member 3 comprises at least three second fixed fitting members 31, and when the lamp 100 is in the second use state, the fixed members 411 of the three connecting rods 41 are correspondingly connected to the at least three second fixed fitting members 31.

The lamp 100 is changed between the first use state and the second use state through assembly and disassembly of the at least three connecting rods 41. For example, when the lamp 100 is in the first use state, the at least three connecting rods 41 are connected successively through the fixed members 411 and the first fixed fitting member 412 to define the lifting rod 42. When the lamp 100 is in the second use state, the fixed members 411 are connected to the at least three second fixed fitting members 31, the second ends of the at least three connecting rods 41 define the placing plane 43, and the lamp 100 is supported on the desk or the floor through the placing plane 43.

Specifically, the fixed member 411 comprises a fixed push button 4111. At least one of the first fixed fitting member 412 or each of the at least three second fixed fitting members 31 comprises a locking groove 6 configured to receive the fixed push button 4111. When the fixed member 411 is connected to the first fixed fitting member 412 or each of the at least three second fixed fitting members 31, the fixed push button 4111 correspondingly moves into the locking groove 6.

The fixed member 411 comprises an elastic member 4112 and a sliding groove 4113, and the sliding groove 4113 is disposed on each of the at least three connecting rods 41 and extends along a radial direction of each of the at least three connecting rods 41. The elastic member 4112 is disposed between the sliding groove 4113 and the fixed push button 4111. The first fixed fitting member 412 and each of the at least three second fixed fitting members 31 respectively comprises a connecting groove 5, and a surrounding wall of the connecting groove 5 comprises the locking groove 6. When the first end of each of the at least three connecting rods 41 moves into the connecting groove 5, the fixed push button 4111, which is pushed by the surrounding wall of the connecting groove 5 and retracted, moves into the locking groove 6 when corresponding to the locking groove 6.

In this embodiment, the at least three connecting rods 41 are successively sleeved and connected to make the lifting rod extendable. More specifically, radial dimensions of the at least three connecting rods 41 increase successively, and the at least three connecting rods 41 have a same length. During an extension process, one of the at least three connecting rods 41 having a smaller radial dimension moves into another one of the at least three connecting rods 41 having a larger radial dimension. The lifting rod 42 has a minimum length corresponding to a length of each of the at least three connecting rods 41, and the lifting rod 42 has a maximum length corresponding to a length of the at least three connecting rods 41 when successively connected. Specifically, the connecting groove 5 of the first fixed fitting member 412 extends along the axial direction, and the locking groove 6 is adjacent to an opening of the connecting groove 5. One of the at least three connecting rods 41 slides in the connecting groove 5 of another one of the at least three connecting rods 41. When the lamp 100 is in the first use state, a distal end of one of the at least three connecting rods 41 that has a minimum radial dimension is connected to the first connecting member 2.

Figure 4:
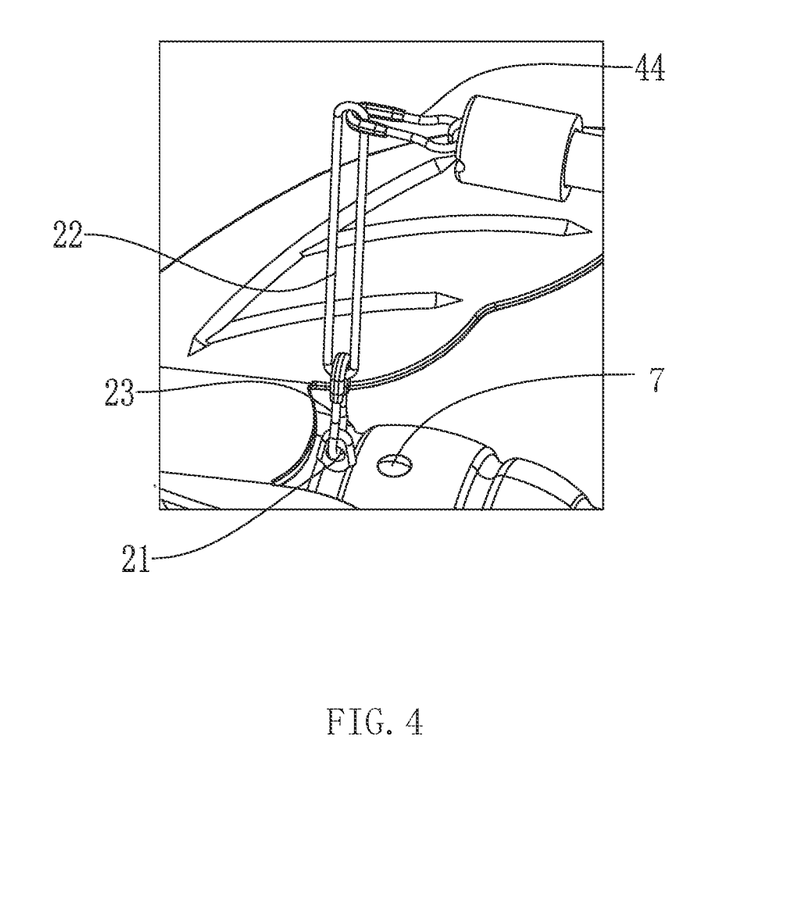
FIG. 4 illustrates a partial perspective view of a lifting rod and a first connecting member, which are connected together, in the preferred embodiment of the present disclosure when the lamp is in the first use state.

The first end of the lifting rod 42 is disposed with a first carabiner 44, and the first connecting member 2 comprises a connecting ring 21, a wire loop 22, and a second carabiner 23. The connecting ring 21 is fixedly connected to the lamp body 1, and the second carabiner 23 is configured to be respectively buckled to the connecting ring 21 and the wire loop 22. The first carabiner 44 is configured to be buckled to the wire loop 22 so as to enable the first carabiner 44 and the second carabiner 23 to be assembled to each other and disassembled from each other conveniently. The first carabiner 44 and the second carabiner 23 are common structures, to which unnecessary details will not be given here.

The second connecting member 3 is detachably connected to the lamp body 1. Specifically, the second connecting member 3 comprises a main body 32 and a connecting sleeve 33. The light transmissive housing 112 comprises a connecting post 1121, and the connecting sleeve 33 is sleeved and connected to the connecting post 1121. The connecting sleeve 33 is connected to the connecting post 1121 by an interference fit or by a snap-fit connection, but the disclosure is not limited in this regard.

In this embodiment, three of the connecting grooves 5 are defined on a side of the main body 32 facing away from the connecting sleeve 33, and extending directions of the three of the connecting grooves 5 are splayed at an angle with respect to the main body 32. When the first end of each of the at least three connecting rods 41 moves into the three of the connecting grooves 5 along an axial direction of each of the three of the connecting grooves 5 and the fixed push button 4111, which is retracted, moves into the locking groove 6 when corresponding to the locking groove 6, the fixed push button 4111 fixedly connects the first end of each of the at least three connecting rods 41 and the main body 32. In this embodiment, the locking groove 6 penetrates through the main body 32, the fixed push button 4111 moves into the locking groove 6 through a first end of the locking groove 6 connected to the three of the connecting grooves 5, and the user can push the fixed push button 4111 that is exposed out of a second end of the locking groove 6 so as to disconnect the first end of each of the at least three connecting rods 41 and the second connecting member 3. In this embodiment, one end of each of the at least three connecting rods 41 that is adjacent to the first fixed fitting member 412 is sleeved with a supporting sleeve 413. When the lamp 100 is in the second use state, the end of each of the at least three connecting rods 41 that is sleeved with the supporting sleeve 413 is supported on the desk or the floor, which can prevent wear of the at least three connecting rods 41. The supporting sleeve 413 can be made of rubber material.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A lamp, comprising:
   a lamp body, and
   a connecting rod assembly, wherein:
   the lamp body is disposed with a first connecting member and a second connecting member,
   the connecting rod assembly is connected to the first connecting member to define a first use state,
   the connecting rod assembly is connected to the second connecting member to define a second use state,
   the connecting rod assembly comprises at least three connecting rods,
   one or more first ends of the at least three connecting rods comprise one or more fixed members,
   the second connecting member comprises at least three second fixed fitting members,
   when the lamp is in the first use state:
      one of the at least three connecting rods or at least two connecting rods of the at least three connecting rods which are connected successively in an axial direction defines a lifting rod, and
      a first end of the lifting rod is connected to the first connecting member, and when the lamp is in the second use state:
      the one or more fixed members of the at least three connecting rods are connected correspondingly to the at least three second fixed fitting members, and
      one or more second ends of the at least three connecting rods are spaced apart from each other to define a placing plane within which a vertical projection of a center of gravity of the lamp body is located.

2. The lamp according to claim 1, wherein:
   the one or more second ends of the at least three connecting rods comprise one or more first fixed fitting members, and
   when the lamp is in the first use state:
      the at least two connecting rods of the at least three connecting rods are connected successively in the axial direction, and
      one of the one or more fixed members is correspondingly connected to one of the one or more first fixed fitting members of the at least two connecting rods other than one of the at least two connecting rods in which the one of the one or more fixed members is disposed.

3. The lamp according to claim 2, wherein:
   the one or more fixed members comprise one or more fixed push buttons,
   at least one of the one or more first fixed fitting members or the at least three second fixed fitting members comprises one or more locking grooves configured to receive the one or more fixed push buttons, and
   when the one or more fixed members are connected to the one or more first fixed fitting members or the at least three second fixed fitting members, the one or more fixed push buttons correspondingly moves into the one or more locking grooves.

4. The lamp according to claim 3, wherein:
   the one or more fixed members comprise one or more elastic members and one or more sliding grooves,
   the one or more sliding grooves are disposed on the at least three connecting rods and extend along a radial direction of the at least three connecting rods,
   the one or more elastic members are disposed between the one or more sliding grooves and the one or more fixed push buttons,
   the one or more first fixed fitting members and the at least three second fixed fitting members respectively comprise one or more connecting grooves,
   one or more surrounding walls of the one or more connecting grooves comprises the one or more locking grooves, and
   when the one or more first ends of the at least three connecting rods move into the one or more connecting grooves, the one or more fixed push buttons, which are pushed by the one or more surrounding walls of the one or more connecting grooves and retracted, move into the one or more locking grooves when corresponding to the one or more locking grooves.

5. The lamp according to claim 4, wherein:
   the at least three connecting rods are successively sleeved and connected to make the lifting rod extendable,
   the one or more connecting grooves of the one or more first fixed fitting members extend along the axial direction,
   the one or more locking grooves are adjacent to one or more openings of the one or more connecting grooves, and
   one of the at least three connecting rods slides in one of the one or more connecting grooves of the at least three connecting rods other than the one of the at least three connecting rods.

6. The lamp according to claim 1, wherein:
   the first end of the lifting rod is disposed with a first carabiner, the first connecting member comprises a connecting ring, a wire loop, and a second carabiner, the connecting ring is fixedly connected to the lamp body, the second carabiner is configured to be respectively buckled to the connecting ring and the wire loop, and the first carabiner is configured to be buckled to the wire loop.

7. The lamp according to claim 1, wherein:

the second connecting member is configured to be detachably connected to the lamp body.

8. The lamp according to claim 1, wherein:

the lamp body comprises a lamp housing and a light-emitting assembly disposed in the lamp housing, the lamp housing comprises a shade housing facing upward and a light transmissive housing facing downward, the shade housing comprises a connecting hole, the lamp body comprises a light transmissive decoration, which is connected to the connecting hole, and the light-emitting assembly is configured to emit a light ray for illuminating the light transmissive decoration through the connecting hole.

9. The lamp according to claim 1, wherein:

the lamp body comprises a lamp housing and a light-emitting assembly disposed in the lamp housing, and the lamp housing comprises a first light transmissive housing and a second light transmissive housing disposed on the first light transmissive housing.

10. The lamp according to claim 2, wherein:

the lamp body comprises a lamp housing and a light-emitting assembly disposed in the lamp housing, the lamp housing comprises a shade housing facing upward and a light transmissive housing facing downward, the shade housing comprises a connecting hole, the lamp body comprises a light transmissive decoration, which is connected to the connecting hole, and the light-emitting assembly is configured to emit a light ray for illuminating the light transmissive decoration through the connecting hole.

11. The lamp according to claim 2, wherein:

the lamp body comprises a lamp housing and a light-emitting assembly disposed in the lamp housing, and the lamp housing comprises a first light transmissive housing and a second light transmissive housing disposed on the first light transmissive housing.

12. The lamp according to claim 3, wherein:

the lamp body comprises a lamp housing and a light-emitting assembly disposed in the lamp housing, the lamp housing comprises a shade housing facing upward and a light transmissive housing facing downward, the shade housing comprises a connecting hole, the lamp body comprises a light transmissive decoration, which is connected to the connecting hole, and the light-emitting assembly is configured to emit a light ray for illuminating the light transmissive decoration through the connecting hole.

13. The lamp according to claim 3, wherein:

the lamp body comprises a lamp housing and a light-emitting assembly disposed in the lamp housing, and the lamp housing comprises a first light transmissive housing and a second light transmissive housing disposed on the first light transmissive housing.

14. The lamp according to claim 4, wherein:

the lamp body comprises a lamp housing and a light-emitting assembly disposed in the lamp housing, the lamp housing comprises a shade housing facing upward and a light transmissive housing facing downward, the shade housing comprises a connecting hole, the lamp body comprises a light transmissive decoration, which is connected to the connecting hole, and the light-emitting assembly is configured to emit a light ray for illuminating the light transmissive decoration through the connecting hole.

15. The lamp according to claim 4, wherein:

the lamp body comprises a lamp housing and a light-emitting assembly disposed in the lamp housing, and the lamp housing comprises a first light transmissive housing and a second light transmissive housing disposed on the first light transmissive housing.

16. The lamp according to claim 5, wherein:

the lamp body comprises a lamp housing and a light-emitting assembly disposed in the lamp housing, the lamp housing comprises a shade housing facing upward and a light transmissive housing facing downward, the shade housing comprises a connecting hole, the lamp body comprises a light transmissive decoration, which is connected to the connecting hole, and the light-emitting assembly is configured to emit a light ray for illuminating the light transmissive decoration through the connecting hole.

17. The lamp according to claim 5, wherein:

the lamp body comprises a lamp housing and a light-emitting assembly disposed in the lamp housing, and the lamp housing comprises a first light transmissive housing and a second light transmissive housing disposed on the first light transmissive housing.

18. A lamp, comprising:

a lamp body, and a connecting rod assembly, wherein:

the lamp body is disposed with a first connecting member and a second connecting member, the connecting rod assembly is connected to the first connecting member to define a first use state, the connecting rod assembly is connected to the second connecting member to define a second use state, the connecting rod assembly comprises at least three connecting rods, when the lamp is in the first use state:

one of the at least three connecting rods or at least two connecting rods of the at least three connecting rods which are connected successively in an axial direction defines a lifting rod, and a first end of the lifting rod is connected to the first connecting member, when the lamp is in the second use state:

one or more first ends of the at least three connecting rods are connected to the second connecting member, and one or more second ends of the at least three connecting rods are spaced apart from each other to define a placing plane within which a vertical projection of a center of gravity of the lamp body is located, the first end of the lifting rod is disposed with a first carabiner, the first connecting member comprises a connecting ring, a wire loop, and a second carabiner, the connecting ring is fixedly connected to the lamp body, the second carabiner is configured to be respectively buckled to the connecting ring and the wire loop, and the first carabiner is configured to be buckled to the wire loop.

\* \* \* \* \*